UNITED STATES PATENT OFFICE 1,938,630

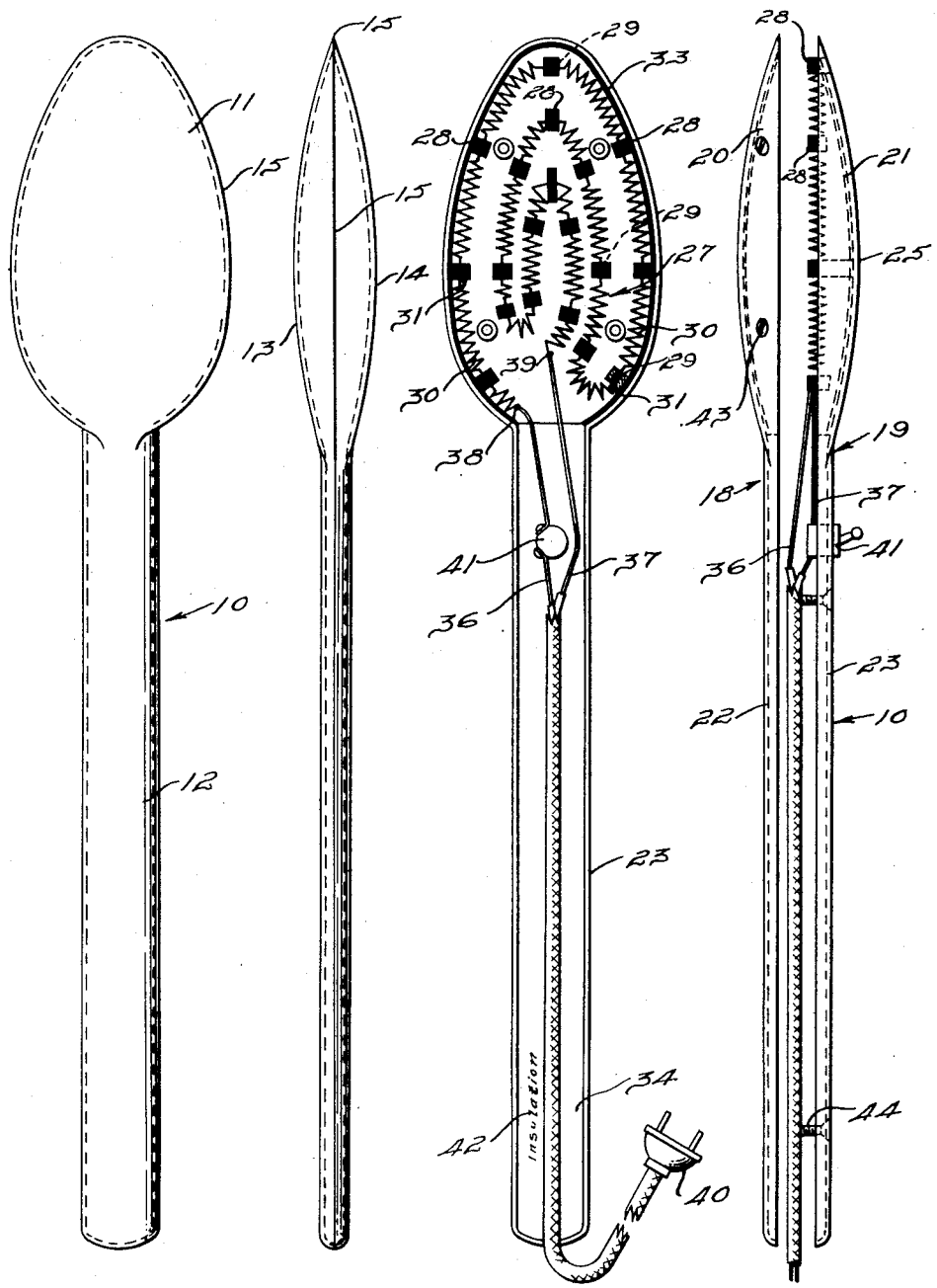

SOLDERING SPOON

Oscar F. Kuula, Munising, Mich.

Application April 16, 1931. Serial No. 530,568

4 Claims. (Cl. 219—26)

This invention relates to a soldering device and has particular relation to a metallic paddle particularly useful in repairing motor vehicle bodies and the like.

An object of the invention is to provide a soldering paddle having a polished aluminum surface.

Another object of the invention is to provide a soldering paddle that may be employed without the aid of a blow torch, as is now practiced, thereby permitting the device to be employed with safety adjacent gasoline tanks, or paint and varnishes.

Prior to my invention, a wooden paddle was employed in repairing dents, deep scratches or any type of a break in automobile bodies, or other metallic objects, which were of such a nature as to require the use of solder to build up the damaged portion to correspond with the surface thereabout. In this method the damaged portion was first cleaned, after which it was heated with a blow torch and the solder disposed therein. While a blow torch was maintained adjacent the damaged portion to keep the solder in a substantial liquid form, the wooden paddle was repeatedly dipped in oil and employed to smooth or finish off the solder portion to the contour desired. It is not only extremely dangerous to employ an apparatus of this type in and around motor vehicle repair shops, because of the unavoidable presence of gasoline, paints and lacquers, but it is also necessary to frequently replace the wooden paddles because the edge portions thereof are readily destroyed by the action of the blow torches and hot solder. Furthermore, the heat quickly destroys the smooth surfaces of the paddles and makes them unfit for good results.

In the simplest form of my invention I have prepared a soldering paddle having an aluminum paddle portion and a heat proof handle. In the broader aspects of the present invention various kinds of metal may be employed, but polished aluminum is preferred because solder for ferrous metals will not adhere to an aluminum surface. The paddle portion is provided with at least one, and preferably a pair of convex surfaces, the outer periphery of which terminates in a knife edge. While it is desirable to employ polished aluminum for both surfaces it is not entirely necessary and only one surface of polished aluminum may be employed. In a soldering device of such construction it is necessary to employ a blow torch when making a repair, but the use of oil that has heretofore been essential when employing wooden paddles is entirely obviated. In addition, the knife edge provided in my device will maintain its efficiency indefinitely, as will the smoothness of the surfaces thereof, thus greatly reducing the ultimate cost of the repair portions.

The above form of my invention may be somewhat improved by so constructing it to include an enclosed electric heating element, as will hereafter be described, thus not only eliminating the use of a blow torch or the like, with all its attendant dangers, but providing an article that is more convenient and efficient in use.

For a better understanding of the invention reference may now be had to the accompanying drawing, forming a part of this specification, in which Figure 1 is a plan view of a soldering paddle, without a heating unit, constructed in accordance with my invention.

Figure 2 is a side elevational view of the soldering paddle shown in Figure 1

Figure 3 is a plan view of one-half of a soldering paddle of the type shown in Figures 1 and 2 but incorporating an electric heating unit therein.

Figure 4 is a side elevational view of a soldering paddle one-half of which is shown in Figure 3, the two halves being shown in spaced relation, prior to securing them together to form a paddle of the same shape as that shown in Figure 2.

In practicing my invention a soldering paddle 10 is provided with an aluminum paddle portion 11 and a handle portion 12, integral with the paddle 11. As best shown in Figures 1 and 2, the soldering paddle is provided with a pair of oppositely disposed or convex surfaces 13 and 14, which terminate in a knife edge 15, centrally of the convex surfaces 13 and 14. It is obvious that the relative convexity of both surfaces 13 and 14 do not necessarily have to conform to each other for the proper practice of the present invention, and one of them may be entirely flat in some cases. These surfaces, or at least one of them, are preferably brought to a high polish so as to render them more resistive to the tendency of solder to adhere thereto. In its simplest form, this paddle may be made of solid aluminum, or may be built up of aluminum halves. In a soldering device of this simple type it is necessary to employ a blow torch or other heating device for heating the solder and the paddle portion 11.

As best shown in Figures 3 and 4 the soldering device comprises a pair of elements 18 and 19, each element having an aluminum paddle portion 20 and 21 and a handle portion 22 and 23. The paddle portions 20 and 21 are each provided with a convex surface portion 24 and 25 the inner side of which, is hollowed to permit the mounting therein of a heating unit 27. The heating unit is provided with a plurality of porcelain members 28 mounted in the paddle 20, and having openings 29 therein, and a plurality of heating elements 30, disposed between the porcelain members 28 and operatively connected to each other by wires 31 passing through the openings 29, of the members 28. The heating units are spaced and insulated from the paddle portions 20 and 21 by insulating material 33, of any suitable kind. The handle portions 22 and 23, integral with the paddle portions 20 and 21 are each provided with a recess portion 34. Disposed in the recess portion 34 of the handle 22, are circuit wires 36 and 37, one end of each being connected to an end of a heating element, as indicated at 38 and 39, while the other end of each is connected to a plug 40, adapted to be inserted in a co-acting member secured to a source of power. A switch 41 extending through the handle portion 23 is connected to the circuit wiring for controlling the current from the source of supply, to the heating unit. An insulating material 42 of any suitable kind, packed in the recess 34 about the circuit wires 36 and 37 is provided to protect the handle portion from being heated by radiation from the heating element. The elements 18 and 19 are rigidly secured together by means of screws 43 and 44 disposed in lugs 44 of the portion 18 and handle portion 23 respectively. The handle portion may be insulated against heat or an insulated grip mounted thereon in any desired manner, as is well known in the art.

In employing this soldering device, the paddle portion is brought up to heat by the heating unit, the solder is disposed in the cut or part to be repaired, which has been properly prepared, and the paddle is applied to the solder until the solder is melted and the cut portion has been substantially filled with solder. After a sufficient amount of solder is supplied to the portion to be repaired, the paddle, and particularly the smooth convex surfaces and knife edges thereof, are employed to finish or smooth off the solder so as to conform with the area adjacent the repaired portion. It will be noted that the paddle portion of the soldering device may be maintained at any temperature desired, for efficient working of the solder, by properly controlling the switch 41.

From the foregoing description, it is apparent that I have provided a soldering paddle in which the defects and hazard heretofore encountered in the art of soldering materials, particularly when employed adjacent inflammable substances, are entirely obviated, which provides a device that is extremely safe in operation, and more efficient and economical in use than has been possible with the articles heretofore employed.

Although I have illustrated but two forms which my invention may assume, and have described in detail but a single application of each thereof, it will be apparent to those skilled in the art that it is not so limited but that various modifications and changes may be made therein without departing from the spirit or substance of my invention, the scope of which is commensurate with the appended claims.

I claim:

1. A soldering device, comprising a metallic paddle, having a pair of convex surfaces at least one of which is of polished aluminum, the outer periphery of said paddle comprising a knife edge, a handle fixed to the paddle, an electrical heating unit in the paddle, and means for conducting a circuit to the heating unit.

2. A soldering device, comprising a plurality of aluminum members, each having a convex surface, an electrical heating unit secured in at least one of said members and means rigidly securing said members together, with the outer peripheries thereof forming a knifelike edge.

3. A soldering device, comprising a pair of metallic paddle half portions at least one of which is provided with a convex outer surface of polished aluminum, a handle portion provided with a recess therein and formed integral with each paddle portion, a heating unit disposed in at least one of the paddle portions, electrical wiring disposed in said handle portions, means for rigidly securing the paddle portions together, the outer periphery of the paddle portion abutting to form a knife edge, and means for conducting a current to the heating unit.

4. A soldering device, comprising a pair of aluminum paddle portions, each having a convex outer surface, a handle portion provided with a recess therein and formed integral with each paddle portion, a plurality of porcelain members disposed in one of the paddle portions, a plurality of heating elements positioned between the porcelain members, each heating element having a wire extending through an opening in the porcelain members connecting the joining heating element, electrical wiring, disposed in one of the handle portions, connected to each end of said heating unit, means for rigidly securing the portions together, the outer periphery of the paddle portion abutting to form a knife edge, and means for controlling the supply of electric current to the heating element.

OSCAR F. KUULA.